US012606036B2

(12) United States Patent

Lee

(10) Patent No.: US 12,606,036 B2

(45) Date of Patent: Apr. 21, 2026

(54) EVSE COUPLER LOCKING SYSTEMS, VEHICLES, AND CONTROL LOGIC FOR MANAGING VEHICLE CHARGING WITH BROKEN COUPLER LATCHES

(71) Applicant: GM GLOBAL TECHNOLOGY OPERATIONS LLC, Detroit, MI (US)

(72) Inventor: Kodjo Muata Lee, Superior Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 686 days.

(21) Appl. No.: 18/182,842

(22) Filed: Mar. 13, 2023

(65) Prior Publication Data

US 2024/0308359 A1 Sep. 19, 2024

(51) Int. Cl.
 *B60L 53/16* (2019.01)
 *B60L 53/30* (2019.01)
 (Continued)

(52) U.S. Cl.
 CPC ............. *B60L 53/16* (2019.02); *B60L 53/305* (2019.02); *B60L 53/35* (2019.02); *B60L 53/66* (2019.02)

(58) Field of Classification Search
 CPC ........ B60L 53/16; B60L 53/305; B60L 53/35; B60L 53/66; B60L 3/04; B60L 53/60; Y02T 10/70; Y02T 10/7072; H01R 13/639
 (Continued)

(56) References Cited

U.S. PATENT DOCUMENTS 7,804,274 B2 * 9/2010 Baxter ............... G06Q 20/3278
                                                          414/281
8,262,402 B2 * 9/2012 Gaul ...................... B60L 53/66
                                                          439/304

(Continued)

FOREIGN PATENT DOCUMENTS

DE 102010003523 A1 10/2011
DE 102021102447 A1 8/2021
DE 102012221575 A1 5/2022

OTHER PUBLICATIONS

G. H. Fox, "Electric Vehicle Charging Stations: Are We Prepared?," in IEEE Industry Applications Magazine, vol. 19, No. 4, pp. 32-38, Jul.-Aug. 2013 (Year: 2013).*

*Primary Examiner* — M Baye Diao

(74) *Attorney, Agent, or Firm* — Quinn IP Law

(57) ABSTRACT

Presented are charger coupler locking systems with control logic for managing vehicle charging, methods for making/using such systems, and vehicles equipped with such systems. A method of controlling charging of a vehicle includes a vehicle controller receiving a signal indicating a charger coupler of a vehicle charging system is inserted into a charger port of the vehicle and, when received, responsively commanding an actuator device of a coupler locking system to move a locking element against a latching element of the charger coupler. The controller then receives sensor data from a position sensing device indicative of a travel position of the locking element; from this sensor data, the controller determines if the locking element's travel position is displaced from a predefined lock position at which the locking element contacts the latching element. If so, the controller responsively commands the vehicle's battery charging system to disable charging of the battery assembly.

20 Claims, 2 Drawing Sheets

(51) Int. Cl.
  *B60L 53/35*       (2019.01)
  *B60L 53/66*       (2019.01)
(58) Field of Classification Search
  USPC ........................................................ 320/109
  See application file for complete search history.

(56)              References Cited

U.S. PATENT DOCUMENTS

| | | | |
|---|---|---|---|
| 8,550,833 B2* | 10/2013 | Martin | H01R 13/6397 |
| | | | 439/372 |
| 8,878,488 B2 | 11/2014 | Ono | |
| 9,071,074 B2 | 6/2015 | Chen | |
| 9,073,439 B2* | 7/2015 | Brown | B60L 53/00 |
| 9,475,399 B2* | 10/2016 | Fontana | B60L 53/68 |
| 10,604,015 B1* | 3/2020 | Singh | B60K 35/60 |
| 10,625,623 B2* | 4/2020 | Lyon | H01R 13/633 |
| 10,809,733 B2 | 10/2020 | Lindemann | |
| 11,135,931 B2 | 10/2021 | Martin | |
| 11,462,752 B2 | 10/2022 | Pettit | |
| 11,685,278 B1* | 6/2023 | Nabizada | B60L 53/51 |
| | | | 320/109 |
| 12,214,684 B2* | 2/2025 | Zhu | H02J 7/0068 |
| 2013/0089999 A1* | 4/2013 | Martin | H01R 13/6395 |
| | | | 439/345 |
| 2013/0337669 A1 | 12/2013 | Najera | |
| 2016/0285296 A1 | 9/2016 | Manou | |
| 2017/0299401 A1 | 10/2017 | Choi | |
| 2019/0375300 A1* | 12/2019 | Lyon | B60L 53/16 |
| 2019/0378365 A1* | 12/2019 | Jordan, III | B60L 53/60 |
| 2020/0076224 A1* | 3/2020 | Tsukamoto | H01M 10/625 |
| 2020/0353839 A1 | 11/2020 | Tarchinski | |
| 2022/0355697 A1 | 11/2022 | Wiebenga | |
| 2023/0420976 A1* | 12/2023 | Aimi | B60L 53/60 |

\* cited by examiner

EVSE COUPLER LOCKING SYSTEMS, VEHICLES, AND CONTROL LOGIC FOR MANAGING VEHICLE CHARGING WITH BROKEN COUPLER LATCHES

INTRODUCTION

The present disclosure relates generally to electrical systems for charging motor vehicles. More specifically, aspects of this disclosure relate to systems, methods, and devices for governing vehicle charging using plug-in-type vehicle supply equipment.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). Arranged across the positive and negative terminals of the main DC bus is a high-frequency bulk capacitor that provides electrical stability and stores supplemental electrical energy. A dedicated Electronic Battery Control Module (EBCM), through collaborative operation with a Powertrain Control Module (PCM) and each motor's power electronics package, governs operation of the battery pack(s) and traction motor(s).

As hybrid and electric vehicles become more prevalent, infrastructure is being developed and deployed to make day-to-day use of such vehicles feasible and convenient. Electric vehicle supply equipment (EVSE) for recharging electric-drive vehicles comes in many form factors, including residential electric vehicle charging stations (EVCS) that are purchased and operated by a vehicle owner (e.g., installed in the owner's garage), publicly accessible EVCS offered by public utilities or private retailers (e.g., at municipal or commercial charging facilities), and advanced high-voltage, fast-charging stations used by manufacturers, dealers, and service stations. (e.g., OEM multi-coupler 360+kW DCFC superchargers). Plug-in-type hybrid and electric vehicles, for instance, may be recharged by physically connecting a charging cable of the EVSE to a complementary charging inlet of the vehicle. By comparison, wireless charging systems utilize electromagnetic field (EMF) induction to provide vehicle charging capabilities without the need for charging cables and cable ports. In most countries, a standardized conductive charger coupler is used to connect the EVCS to the vehicle's HV electrical system. The plug-in vehicle is equipped with a standardized charger inlet port for electrically mating with the charger coupler and locking the coupler in place to prevent inadvertent or unwanted decoupling.

SUMMARY

Presented herein are charger coupler locking systems with attendant control logic for governing plug-in vehicle charging, methods for making and methods for operating such coupler locking systems, and electric-drive vehicles equipped with such coupler locking systems. In an example, a plug-in-type electrified vehicle has an on-body charger inlet port that mates with an EVSE charging cable coupler to electrically connect the vehicle's rechargeable energy storage system (RESS) to a remote power source, such as a public power utility. When inserted into the charger port, a coupler latching device projecting forward from the cable coupler's head latches onto a mating catch inside the charger port. The coupler latching device may be in the nature of a spring-biased latch hook that inserts into a complementary latch hole and snap-locks onto a matching latch detent to prevent inadvertent disconnection of the cable coupler from the charger port. Other EVSE coupling latches, including rotational locks with cams or designs with similar functionality, are within the scope and spirit of this disclosure.

The vehicle's charger port is equipped with an electro-mechanical coupler locking system with a lock plate or cam that is automated to physically press onto the latching device and thereby lock the coupler to the port. During activation of the coupler locking system, a vehicle interface control module (VICM), alone or in cooperation with an EBCM, communicates with a linear or rotational transducer to actively monitor a real-time or near real-time position of the lock plate/cam. Upon determining that the lock plate/cam's travel position is approximately equal to (e.g., within 0-5% of) a predefined lock position, the VICM confirms that the coupler's latching device is securely locked in place and responsively enables RESS charging. In this instance, the coupler locking system's lock plate/cam may apply additional force to the coupler latch to lock it in place.

Conversely, if the lock plate/cam's travel position is displaced from the predefined lock position by at least a predefined offset (e.g., >5%), the VICM confirms that the cable coupler latch is not properly locked and responsively disables RESS charging. The VICM may concomitantly transmit an electronic notification warning the vehicle user that the cable coupler is not locked and that charging has been temporarily disabled. The VICM may prompt the vehicle user to approve or reject the disabling of vehicle charging; as per the latter, charging may be enabled at a reduced charging rate/voltage. In this instance, the coupler locking system's lock plate/cam may apply additional force to the charger coupler's head to reduce the risk of it decoupling from the port. An attendant advantage of at least some of the disclosed coupler locking systems and control logic is ensuring a complete and secure electrical connection between the charger coupler and charging port during vehicle charging to prevent inadvertent charger decoupling and any resultant arcing events or thermal events.

Aspects of this disclosure are directed to vehicle charging control systems, system control logic, and memory-stored instructions for managing plug-in vehicle charging, such as direct-current fast charging (DCFC) using a Level 2 SAE J1772 Plug or a CCS Type 1 or 2 Plug. In an example, a method is presented for controlling charging of a host vehicle, which has a battery assembly that is connectable via a charger port to a charger coupler of a vehicle charging system. This representative method includes, in any order and in any combination with any of the above and below disclosed options and features: receiving, e.g., via a resident or remote controller or module or network of controllers/modules (collectively "controller" or "vehicle controller") from an EVSE interface or current sensor, a connection signal indicating the charging system's charger coupler is inserted into the vehicle's charger port. Upon receiving the connection signal, the controller responsively transmits an activation signal to an actuator device of an on-vehicle coupler locking system, which causes the actuator device to move a locking element towards a latching element of the charger coupler. After activating the coupler locking system, the controller communicates with a position sensing device to receive sensor data indicative of a travel position of the locking element. From this sensor data, the vehicle controller determines if the locking element's travel position is displaced from a predefined lock position at which the locking element contacts the charger coupler's latching element. If so, the vehicle controller responsively transmits a disabling signal to the vehicle's battery charging system to at least temporarily disable charging of the battery assembly.

Aspects of this disclosure are also directed to computer-readable media (CRM) for managing plug-in vehicle charging using on-vehicle charger coupler locking systems. In an example, a non-transitory CRM stores instructions executable by one or more processors of a vehicle controller to govern charging of a host vehicle. These instructions, when executed by the processor(s), cause the controller to perform operations, including: receiving a connection signal indicating a charger coupler of a vehicle charging system is inserted into a charger port of the vehicle; transmitting, responsive to receiving the connection signal, an activation signal to an actuator device of a coupler locking system of the vehicle to move a locking element of the coupler locking system towards a latching element of the charger coupler; receiving, from a position sensing device of the vehicle after transmitting the activation signal, sensor data indicative of a travel position of the locking element; determining, using the sensor data, if the travel position of the locking element is displaced from a predefined lock position at which the locking element contacts the latching element; and transmitting, responsive to determining the travel position is displaced from the predefined lock position, a disabling signal to a vehicle battery charging system of the vehicle to disable charging of a battery assembly of the vehicle.

Additional aspects of this disclosure are directed to smart vehicles that manage vehicle charging using on-vehicle charger coupler locking systems. As used herein, the terms "vehicle" and "motor vehicle" may be used interchangeably and synonymously to include any relevant vehicle platform, such as passenger vehicles (ICE, HEV, FEV, fuel cell, etc.), commercial vehicles, industrial vehicles, tracked vehicles, all-terrain vehicles, motorcycles, farm equipment, watercraft, aircraft, e-bikes, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to drive one or more of the road wheels and propel the vehicle. A rechargeable traction battery pack is mounted onto the vehicle body and operable to power the traction motor(s).

Continuing with the preceding discussion, the vehicle is also equipped with a charger port that receives a charger coupler and thereby electrically connects the traction battery pack to a vehicle charging system. Located adjacent the charger port is a coupler locking system with an actuator device that is operable to move a locking element against a latching element of the charger coupler. The vehicle also includes a resident, remote, or networked controller that is programmed to receive a connection signal indicating the charger coupler is inserted into the charger port and, upon receiving the connection signal, to responsively transmit an activation signal to the actuator device to move the locking element towards the latching element. After transmitting the activation signal, the controller receives sensor data from a position sensing device indicative of a travel position of the locking element and, from this data, determines if the locking element's travel position is displaced from a predefined lock position at which the locking element contacts the latching element. If so, the controller responsively transmits a disabling signal to the vehicle's battery charging system to disable charging of the traction battery pack.

For any of the disclosed vehicles, methods, and CRM, assessing whether or not the locking element's travel position is displaced from the predefined lock position may include determining the travel position is displaced from the lock position by at least a first predefined offset. If the travel position is displaced from the lock position by at least the first predefined offset, the controller may responsively output an electronic notification (e.g., via a centerstack telematics unit or digital instrument panel) that indicates the charger coupler's latching element is broken. In this regard, assessing whether or not the locking element's travel position is displaced from the predefined lock position may include determining the locking element's travel position is displaced from the lock position by at least a second predefined offset. If the travel position is displaced from the lock position by at least the second predefined offset, the controller may responsively output an electronic notification that indicates the charger coupler's latching element is missing.

For any of the disclosed vehicles, methods, and CRM, the vehicle controller may respond to determining the travel position is displaced from the lock position by outputting an electronic notification that prompts an owner, operator, or passenger of the vehicle (collectively "user") to either approve or reject the disabling of charging of the battery assembly. Upon receiving an input signal indicating the user rejected the disabling of charging of the battery assembly, the vehicle controller responsively transmits a command signal to the vehicle battery charging system to enable charging of the battery assembly at a preset reduced charging rate (e.g., reduced from 400 amps (A) to 24 A or 90 A). If the user rejects disabling of charging of the battery assembly, the vehicle controller may responsively command the coupler locking system's actuator device to overtravel the locking element past the lock position and press against the charger coupler's plug head to compress the plug head against a plug receptacle of the charger port.

For any of the disclosed vehicles, methods, and CRM, the vehicle controller may receive an input signal indicating the user approved of the disabling of charging of the battery assembly. In this instance, the vehicle controller may initiate disabling or continue disabling the charging of the battery assembly in response to receiving the user's approval. As yet another option, the vehicle controller may use the sensor data to determine that the locking element's travel position is approximately equal to the predefined lock position. In this instance, the vehicle controller responsively enables the vehicle battery charging system to charge the vehicle battery assembly at full capacity (e.g., 400 A and 480V). Moreover, if the travel position is approximately equal to the lock position, the controller may responsively activate the coupler locking system's actuator device to press the locking element against the latching element to thereby lock the charger coupler to the charger port.

For any of the disclosed vehicles, methods, and CRM, disabling vehicle battery charging may include a battery disconnect unit (BDU) of the vehicle battery charging system opening one or more electrical switches to thereby electrically disconnect the battery assembly from the charger port. As another option, the locking element may include a translatable locking plate or a rotatable locking cam, and the actuator device may include an electric stepper motor or an electric servo motor. In this instance, the motor is operable to move the locking element to any of multiple positions between a deactivated position and an overtravel position past the predefined lock position. Moreover, the position sensing device may include a linear or rotational transducer or a linear or rotational encoder, both of which are operable to output sensor data indicative of a real-time or near real-time travel position of the locking element.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
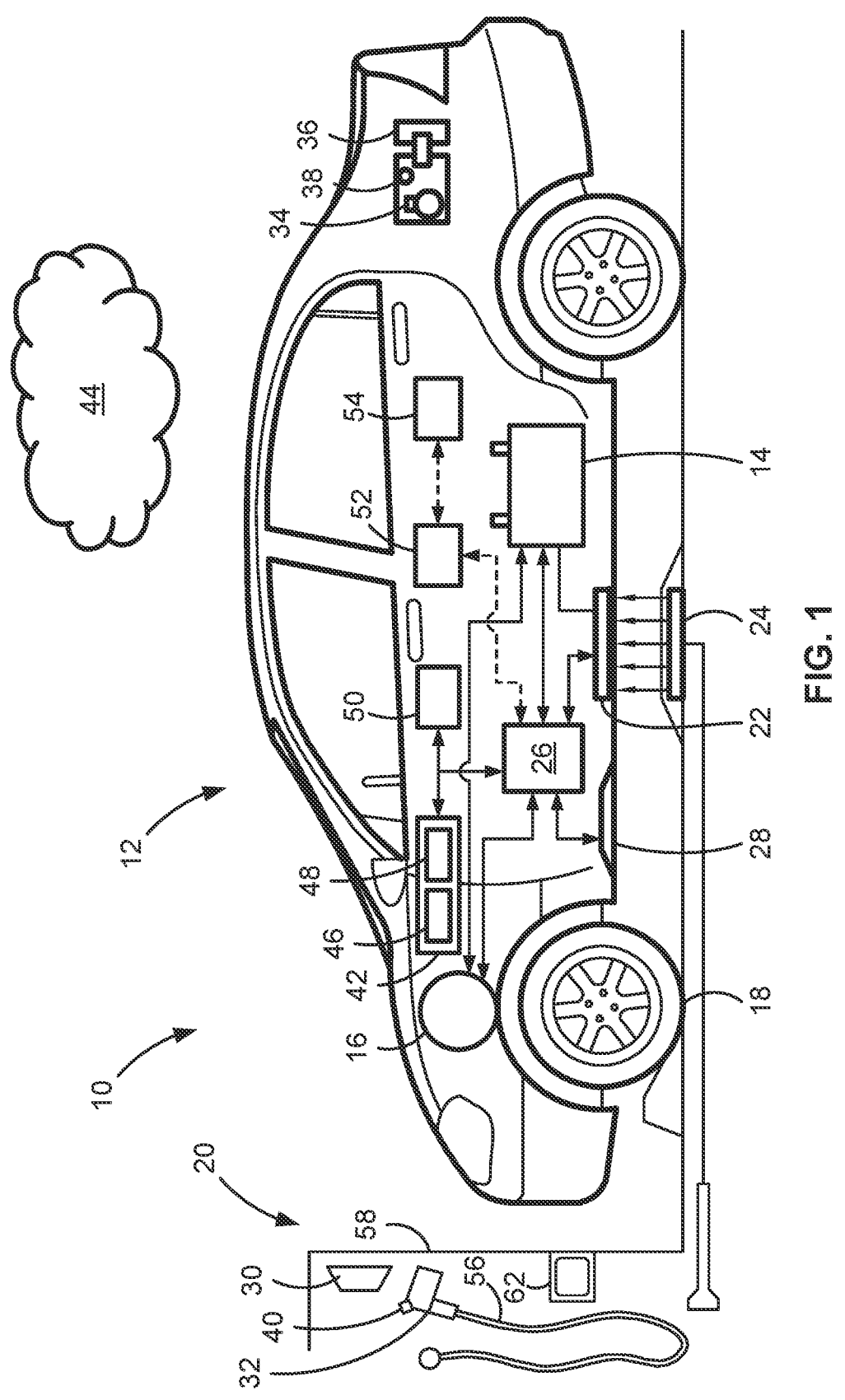
FIG. 1 is a partially schematic, side-view illustration of a representative electric-drive motor vehicle with a rechargeable traction battery pack and a network of in-vehicle controllers, sensing devices, and communication devices for managing vehicle charging and automating coupler locking in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. Moreover, recitation of "first", "second", "third", etc., in the specification or claims is not used to establish a serial or numerical limitation; rather, these designations may be used for case of reference to similar features in the specification and drawings and to demarcate between similar elements in the claims.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into a plug-in battery charging system of an FEV powertrain should also be appreciated as a non-limiting implementation of disclosed features. As such, it will be understood that aspects and features of this disclosure may be applied to other powertrain architectures, implemented for a variety of different EVSE form factors, and incorporated into any logically relevant type of vehicle. Moreover, only select components of the motor vehicle and EVSE are shown and described in additional detail herein. Nevertheless, the vehicles and battery charging systems discussed below may include numerous additional and alternative features, and other available peripheral components, for carrying out the various methods and functions of this disclosure.

FIG. 1 is a simplified illustration of the electric-drive vehicle 10 docked at and operatively coupled to an EVCS 20 of a vehicle charging system for recharging an onboard rechargeable energy storage system (RESS), which is represented in part by a high-voltage direct current (DC) traction battery pack 14. Traction battery pack 14 may take on many suitable configurations, including an array of lead-acid, lithium-ion, nickel-metal hydride, or other apposite electric vehicle battery (EVB). To provide an operable coupling between the traction battery pack 14 and EVCS 20 (also referred to herein as "vehicle charging station"), the vehicle 10 may include an inductive charging component 22, e.g., with an integrated induction coil located between drive wheels 18, that is mounted to the underside of the vehicle body 12. This inductive charging component 22 functions as a wireless charging interface that is compatible with a wireless charging pad 24, e.g., containing an internal EMF coil or other wireless power transfer (WPT) hardware, of the vehicle charging station 20. In the illustrated example, the wireless charging pad 24 is fixtured to the floor underneath the vehicle 10 and is positioned in accordance with a "target position" that may serve as a desired parking location for purposes of efficient and effective wireless charging of the pack 14. By way of example, FIG. 1 depicts the vehicle 10 parked in a manner that helps to ensure the inductive charging component 22 is aligned in both lateral and longitudinal directions (i.e., in proper fore-aft and starboard-port alignment) with the wireless charging pad 24 to complete an inductive charging event for the vehicle 10 while maximizing the percentage of power transmitted wirelessly between the two devices.

The vehicle charging station 20 may employ any heretofore and hereafter developed type of wired and wireless charging technology, including inductive charging, radio charging, capacitive charging, and magneto-dynamic charging, resonance charging, as some non-limiting examples. As for electromagnetic induction charging technology, the representative wireless charging pad 24 of FIG. 1 may be activated with electric current to generate an alternating electromagnetic field proximate the inductive charging component 22. This magnetic field, in turn, induces an electric current in the inductive charging component 22 of the vehicle 10. The induced current may be filtered, stepped-up/down, and/or phase-shifted by in-vehicle electrical modulation circuitry (e.g., power inverter module (PIM)), voltage transformer, etc.) to charge the traction battery pack 14 or any other energy source of the vehicle 10 (e.g., 12V lead-acid starting, lighting, and ignition (SLI) battery, EV super capacitor, etc.). While not per se limited, aspects of this disclosure may be particularly suited for use with plug-in-type Level 3 DCFC capable EVSE that may altogether omit the wireless charging features illustrated in FIG. 1.

Traction battery pack 14 stores energy that can be used for propulsion by one or more electric traction motors 16 and, if desired, for operating other vehicle electrical hardware and auxiliary loads. The traction battery pack 14 is communicatively connected (wired or wirelessly) to one or more vehicle controllers, represented in FIG. 1 by electronic control unit (ECU) 26, that regulates the operation of various onboard vehicle systems and components. Contactors controlled by the ECU 26, for example, may isolate the traction battery pack 14 from other components when opened, and connect the traction battery pack 14 to other components when closed. The ECU 26 is also communicatively connected to the traction motor(s) 16 to control, for example, bi-directional transfer of energy between the battery pack 14 and each motor 16. For instance, the battery pack 14 may provide a DC voltage while a polyphase, hairpin-wound permanent magnet (PM) design of the motor(s) 16 may operate using a three-phase AC current; in such an instance, ECU 26 operates with a traction power inverter module (TPIM) 50 to convert the DC voltage to a three-phase AC current for use by the motor(s) 16. In a regenerative charging mode where the motor(s) 16 act as motor generator units (MGU), the ECU 26 may convert three-phase AC voltage produced by the motor(s) 16 to DC voltage compatible with the traction battery pack 14. The ECU 26 of FIG. 1 is also shown communicating with the charging component 22, for example, to condition the power supplied from the EVCS 20 to the battery pack 14 to help ensure compatible voltage and current levels. The ECU 26 may also interface with the charging station 20 to coordinate the rate and delivery of power to the vehicle 10.

Vehicle charging station 20 of FIG. 1 also offers wired charging via a "plug-in" electrical connector 32, which may be any one of a number of different commercially available connector types. By way of non-limiting example, electrical connector 32 may be a Society of Automotive Engineers (SAE) J1772 (Type 1) or J1772-2009 (Type 2) plug. a Combined Charging Standard (CCS) Type 1 or Type 2 plug, or an International Electrotechnical Commission (IEC) 62196-2 or 62196-3 plug. Moreover, the connector 32 (also referred to herein as "charger coupler") may offer single-phase and/or split-phase modes operating at 120 to 480 volts (V) with alternating current (AC) rates at 80 to 400 amperes (A) peak current for conductive vehicle charging. The connector 32 is shown connecting via an HV electrical power cable 56 to a free-standing EVCS kiosk 58 and, via the kiosk 58, to a public power utility grid (not visible). For DCFC applications, the connector 32 may be equipped with an assortment of connector pins, including working HV direct current (DC+/−) pins, a proximity pin, a single-phase alternating current (AC) line pin, a neutral pin, a protective earthing pin, and a control pilot pin. A resident vehicle CAN or dedicated vehicle interface control module (VICM) 60 (FIG. 2) connects by wire to the power plug 32 and, through this piggyback connection, communicates with the EVCS 20 through the control pilot pin.

Accessible on the exterior of the vehicle body 12 is a charger port 34 configured as an electrical inlet into which the electrical connector 32 may be plugged or otherwise mated. For DCFC plug-in charging applications, the charger port 34 may be a female quick-connect, CCS1-compatible electrical socket that is rated, for example, at DC150 A and 850V. The charger port 34 may function as a wired charging interface that enables a user to easily connect and disconnect the electric vehicle 10 to/from a readily available AC or DC source, such as a public utility power grid via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the vehicle 10 and EVCS 20 may individually or collaboratively monitor charging availability, power quality, and other related issues that may affect vehicle charging. According to the illustrated example, the vehicle ECU 26 may communicate with and receive sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense, and be polled or read by the vehicle's ECU 26 to determine, a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34.

The representative vehicle 10 of FIG. 1 may be originally equipped with a vehicle telecommunication and information ("telematics") unit 42 that wirelessly communicates (e.g., via cell towers, base stations, mobile switching centers (MSCs), etc.) with a remotely located or "off-board" cloud computing system 44. Acting as both a user-input device and a vehicle-output device, telematics unit 42 may be equipped with an electronic video display device and assorted input controls 46 (e.g., buttons, knobs, switches, trackpads, keyboards, touchscreens, etc.). The telematics unit may also operate as a human-machine interface (HMI), e.g., to enable a user to communicate with the telematics unit 42 and other systems and system components of the vehicle 10. Optional peripheral hardware may include a microphone that provides a vehicle occupant with means to input verbal or other auditory commands; the vehicle 10 may be equipped with an embedded voice-processing unit programmed with a computational speech recognition software module. A vehicle audio system with one or more speaker components may provide audible output to vehicle occupants and may be either a stand-alone device dedicated for use with the telematics unit 42 or may be part of a general audio system.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 48, each of which may take on the form of a solid-state drive (SSD), a hard disk drive (HDD), IC device, semiconductor memory (e.g., various types of RAM or ROM), etc., with a real-time clock (RTC). Long-range communication (LRC) capabilities with remote, off-board devices may be provided via one or more or all of a cellular chipset/component, a navigation and location component (e.g., global positioning system (GPS) transceiver), or a wireless modem, all of which are collectively represented at 52. Short-range communication (SRC) connectivity may be provided via a short-range wireless communications device (e.g., BLUETOOTH® unit or near field communications (NFC) transceiver), a dedicated short-range communications (DSRC) component, and/or a dual antenna, all of which are collectively represented at 54. The various communications devices described above may be configured to exchange data as part of a broadcast in a Vehicle-to-Vehicle (V2V) communications system or a vehicle-to-everything (V2X) communications system, e.g., Vehicle-to-Infrastructure (V2I), Vehicle-to-Pedestrian (V2P), Vehicle-to-Device (V2D), etc.

During a vehicle charging event, an owner, operator, or passenger of the vehicle (collectively "user") may park the vehicle 10 adjacent the EVCS kiosk 58, manually retrieve the charger coupler 32, and insert the charger coupler 32 into the charger port 34. When inserted, the user may depress then release the latching button 40 on the handle of the charger coupler 32 in order to raise then lower a latching element protruding forward from the plug head of the charger coupler 32. Doing so operatively couples this latching element with a complementary catch inside the charger port 34 in order to prevent accidental uncoupling of the coupler 32 from the port 34. In at least some applications, the coupler's latching element may be in the nature of a spring-biased latch hook that inserts into a complementary latch hole and snap-locks onto a matching latch detent. By measuring a voltage across the coupler's proximity pin, the vehicle ECU 26 may determine the status of the S3 switch and, from this status, the presence of the charger coupler 32.

Attendant to repeated use of a manually operated device, especially those made accessible at municipal and commercial charging stations, the EVCS 20 may become damaged in a manner that renders the supply equipment inoperable or unsafe. By way of example, the latching element on the plug head of the charger coupler 32 may be faulty, fractured, or completely detached such that the charger coupler 32 may not securely lock to the charger port 34 during vehicle charging. Discussed below are on-vehicle coupler locking systems with attendant control logic for actively detecting whether or not a charger coupler's latch element is present and concomitantly managing vehicle charging. If the latch element is present, the coupler locking system may automate locking of the charger coupler to the charger port and contemporaneously commence charging of the host vehicle. Upon detection of a broken or missing latch, the vehicle may temporarily suspend or outright terminate vehicle charging, inform the vehicle user of the broken/missing latch, and instruct the user to use a different charging station. If the user overrides the temporary suspension of charging, the locking system may apply additional grip retention to the plug head and concurrently enable charging at a reduced voltage/amperage.

Figure 2:
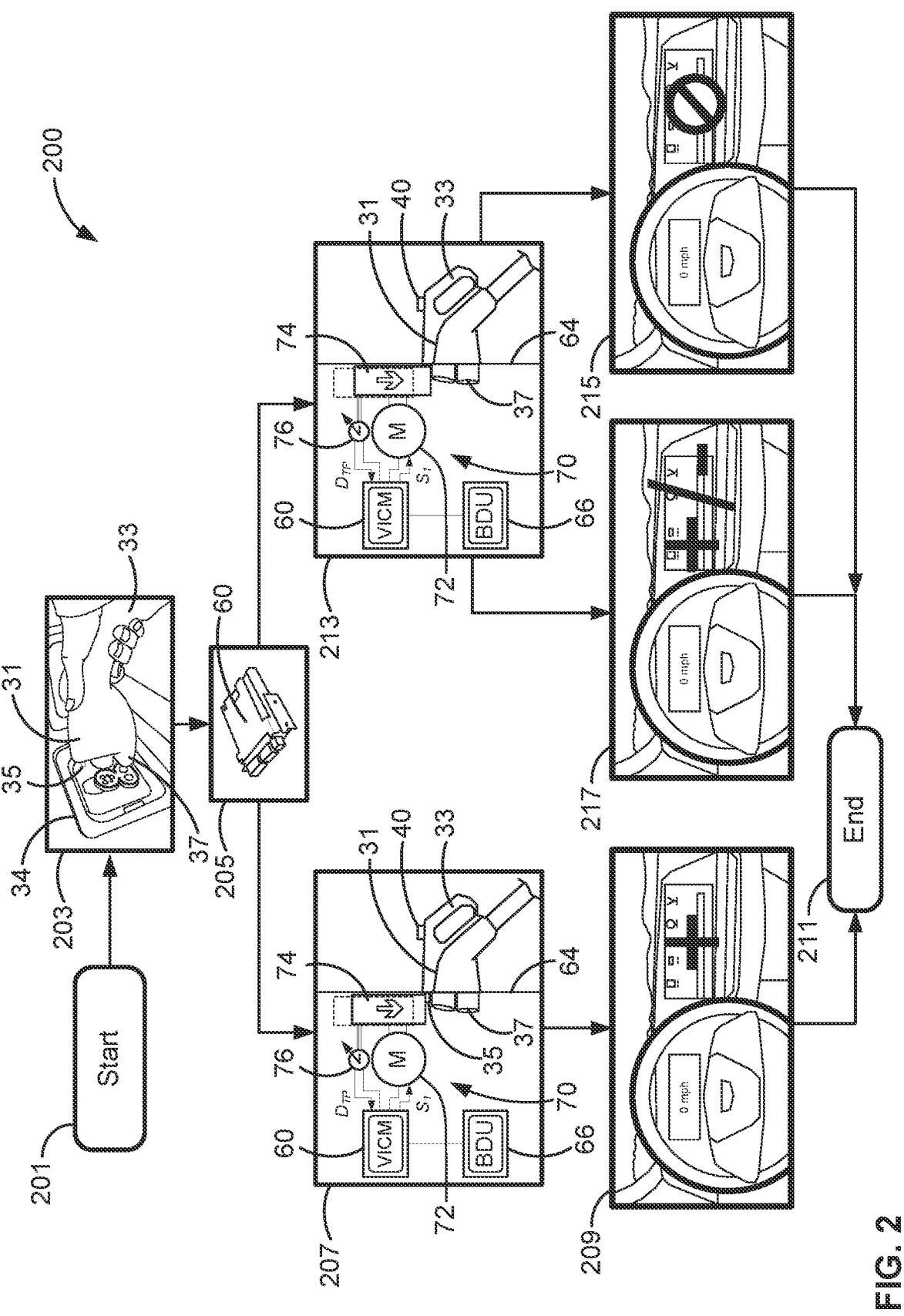
FIG. 2 is a flowchart illustrating a representative smart charging algorithm for managing vehicle charging and automating coupler locking, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for managing a charging operation for a motor vehicle, such as electric-drive vehicle 10 of FIG. 1, is generally described at 200 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., memory device(s) 48 of FIG. 1), and executed, for example, by a resident or remote controller, processing unit, logic circuit, control module, or other device or network of controllers/modules/devices (e.g., ECU 26 and/or cloud computing service 44 of FIG. 1), to perform any or all of the above and below described functions associated with the disclosed concepts. It should be recognized that the order of execution of the illustrated operation blocks may be changed, additional operation blocks may be added, and some of the herein described operation blocks may be modified, combined, or eliminated.

Method 200 begins at START terminal block 201 of FIG. 2 with memory-stored, processor-executable instructions for a programmable controller or control module or similarly suitable processor to call up an initialization procedure for a vehicle charging management protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 201 may initialize responsive to a user command prompt (e.g., via input controls 42), a resident vehicle controller prompt (e.g., from ECU 26 or VICM 60), or a broadcast prompt signal received from a centralized back-office (BO) vehicle services system (e.g., host cloud computing service 44). In another example, the method 200 may initialize at terminal block 201 response to ECU 26 receiving a sensor signal from the CPD sensor 38 indicating that a door status of the charge port door 36 has changed from closed to opened. Upon completion of some or all of the control operations presented in FIG. 2, the method 200 may advance to END terminal block 211 and temporarily terminate or, optionally, may loop back to terminal block 201 and run in a continuous loop.

Advancing from terminal block 201 to PLUG SENSE data input block 203, the method 200 detects the presence of a charger coupler 32 at the charger port 34 of vehicle 10. As described above, for example, a plug head 31 of the charger coupler 32 may include a plug handle 33 with a manually operated latching button 40 at a top end of the handle 33. After retrieving the charger coupler 32 from the EVCS 20, a vehicle user may depress the latching button 40 in order to release the latching element 35 projecting forward from the plug head 31; this allows the user to insert the positive and negative DC+ and DC-current pins 37 into mating terminals within the charger port 34. Once inserted, the user releases the latching button 40 and, in so doing, closes the internal S3 switch, which allows a signal to be sent through the proximity pin to the VICM 60 indicating that the charger coupler 32 has been fully inserted into the charger port 34. It should be appreciated that alternative sensing techniques may be employed to detect the presence of the coupler 32 at data input block 203, including optical or magnetic proximity sensing as some non-limiting examples.

Upon confirming that the EVCS's charger coupler 32 has been inserted into or is otherwise properly mated with the charger port 34, method 200 responsively executes CHARGE PAIRING predefined process block 205 to enable the transmission of electrical power from the EVCS 20 to the vehicle 10. An interface controller area network (CAN) bus module 62 (FIG. 1) of the EVCS 20 may communicate with the resident VICM 60 (FIG. 2) of vehicle 10 to coordinate recharging of the transferee vehicle 10. To facilitate optimized vehicle charging, the VICM 60 may transfer vehicle-specific data to the EVCS's interface CAN module 62, including battery state of charge (SoC), battery state of health (SoH), battery temperature, battery charge capacity, charging hardware constraints, etc. At the same time, the interface CAN module 62 of the EVCS 20 may transmit charging station-specific data to the resident VICM 60 of the transferee vehicle 10, such as station availability, available recharge voltage and rate, charging constraints, communication protocols, pricing, etc.

Before power transfer is initiated, the vehicle 10 first determines whether or not the latching element 35 of the charger coupler 32 has properly locked the coupler's plug head 31 to the charging port's 34 plug receptacle 64. To do so, predefined process block 205 may respond to the detected presence of the charger coupler 32 by initiating charge controls to lock the cable plug to the charge inlet. For instance, COUPLER POSITIVE LOCK process block 207 of FIG. 2 illustrates the VICM 60 transmitting one or more activation signals $S_I$ to an actuator device 72 of a coupler locking system 70; activating the actuator device 72 moves a locking element 74 towards and into abutting engagement with the charger coupler's latching element 35 (e.g., downward in FIG. 2). It may be desirable, for at least some applications, that the activation signal(s) $S_I$ command the actuator device 72 to move the locking element 74 past ("overtravel") the known position of the latching element 35 in order to detect the presence, or lack thereof, of the latching element 35.

While it is envisioned that an assortment of different actuator and lock combinations may be employed, the locking element 74 of FIG. 2 is shown as a reciprocally translatable locking plate or a two-way rotatable locking cam, and the actuator device 72 is shown as a bidirectional electric stepper or servo motor. In this instance, the electric motor is operable to selectively translate/rotate the locking element to multiple positions between a deactivated position (shown hidden in FIG. 2), whereat the locking element 74 is spaced away and disengaged from the latching element 35, and an overtravel position (see, e.g., process block 213), whereat the locking element 74 is located past a predefined lock position at which the locking element 74 engages the latching element 35 and thereby locks the charger coupler 32 to the charger port 34. A position sensing device 76, which may be in the nature of a linear or rotational transducer or a linear or rotational encoder, is operable to actively monitor movement of the locking element 74 and output sensor data indicative of a real-time or near real-time travel position of the locking element 74.

After initiating the charge controls for locking the charger coupler 32 to the charger port 34, the VICM 60 may poll the position sensing device 76 to retrieve position sensor data DTP that is indicative of the travel position of the locking element 74. In process block 207, for example, the VICM 60 may aggregate, process, and analyze the received sensor data to determine whether or not the real-time or near real-time travel position of the locking element 74 is approximately equal to the predefined lock position at which the locking element 74 engages the latching element 35. When the locking element's travel position is approximately equal to the lock position, the VICM 60 may confirm that: (1) the latching element 35 is present and functioning properly; (2) the locking element 74 has secured the latching element 35 onto its mating charge port catch; and (3) the charger coupler 32 is securely locked to the charge port 34.

Moving from process block 207 to CHARGE ENABLED display process block 209, the method 200 may provisionally enable charging of the vehicle 10 through the plug-in connection with the EVCS 20. In particular, the VICM 60 may be programmed to automatically respond to the latching element's travel position coinciding with the latching element's lock position by outputting one or more enabling signals to the onboard charging module (OBCM) and BDU 66 of the vehicle's battery charging system to enable charging of the traction battery pack 14 at full capacity (e.g., 400 A and 480V). Charge enabling signal(s) may cause the BDU 66 to close one or more corresponding electromechanical or solid-state relay switches to thereby electrically connect the battery pack 14 to the charger port 34. At the same time, the VICM 60 may push an electronic "charging enabled" notification, e.g., through the vehicle telematics unit 42, the vehicle's digital instrument cluster, the user's smartphone, and/or a dedicated mobile application, to notify the vehicle user that charging has been enabled. To ensure that the latching element 35 is physically locked in place, the VICM 60 may also output one or more lock activation signals to the actuator device 72 to apply additional motor torque that causes the locking element 74 to press down against the latching element 35 to securely lock the charger coupler 32 to the charger port 34. At this juncture, the method 200 of FIG. 2 may proceed to terminal block 211 and temporarily end or may wait until charging is completed before ending.

There may be use-case scenarios in which the charge coupler's latching element 35 is broken such that the latching element 35 cannot latch the plug head 31 to the plug receptacle 64 and, thus, the locking element 74 cannot securely lock the charger coupler 32 to the charger port 34. Similar to process block 207, COUPLER FAILED LOCK process block 213 of FIG. 2 may employ the VICM 60 to transmit one or more activation signals $S_1$ to the actuator device 72 to move the locking element 74 towards and into engagement with the latching element 35. After initiating charge controls for locking in place the charger coupler 32, the VICM 60 may receive position sensor data DTP from the position sensing device 76 that specifies the travel position of the locking element 74. From this feedback data, the VICM 60 is able to ascertain whether or not the real-time or near real-time travel position of the locking element 73 is displaced from the lock position (i.e., the locking element 74 "overtravels" or "undertravels" the latching element position). When the locking element's travel position is not substantially equal to the lock position, the VICM 60 may confirm that: (1) the latching element 35 is faulty, fractured, or missing (i.e., broken) and not functioning properly; (2) the locking element 74 has not secured the latching element 35 onto its mating charge port catch; and (3) the charger coupler 32 is not securely locked to the charge port 34.

To determine if the locking element's travel position is displaced from the latching element's lock position, the VICM 60 may assess whether or not the travel position is spaced from the lock position by at least a first predefined offset (e.g., at least 3 mm, 10 degrees, and/or 5%) or is spaced from the lock position by at least a second predefined offset (e.g., at least 5 mm, 25 degrees, and/or 10%). In a first instance, position sensor data DTP may indicate that a deployed locking plate is only marginally spaced from the latch's lock position by about 1.5 mm; in this case, the VICM 60 may determine that the latching element 35, while loose, is present and functioning sufficiently well to latch the charger coupler 32 to the charger port 34. In a second instance, position sensor data DTP may indicate that a deployed locking plate has overtraveled the lock position by about 3.7 mm; in this case, the VICM 60 may determine that the latching element 35 is present but cracked and not functioning sufficiently well to latch the charger coupler 32 to the charger port 34. In a third instance, position sensor data DTP may indicate that a deployed locking plate has overtraveled the lock position by about 5.4 mm; in this case, the VICM 60 may determine that the latching element 35 is missing and therefore unable to latch the charger coupler 32 to the charger port 34.

Moving from process block 213 to CHARGE DISABLED display process block 215, the method 200 may temporarily disable charging of the vehicle 10 by the plug-in connection of the EVCS 20. In particular, the VICM 60 may be programmed to automatically respond to the latching element's travel position not coinciding with the latching element's lock position by outputting one or more disabling signals that effect the OBCM/BDU 66 to at least temporarily disable charging of the battery pack 14. As shown, the disabling signal(s) may cause the BDU 66 to open one or more electromechanical or solid-state relay switches to thereby electrically disconnect the battery pack 14 from the charger port 34. At the same time, the VICM 60 may push an electronic "charging disabled" notification, e.g., through the vehicle telematics unit 42, the vehicle's digital instrument cluster, the user's smartphone, and/or a dedicated mobile application, to notify the vehicle user that charging has been temporarily disabled. At this juncture, the VICM 60 may also respond to the locking element's travel position being displaced from the latching element's lock position by at least the first predefined offset by pushing an electronic "fractured latch" notification indicating the charger coupler's latching element is cracked. On the other hand, if the travel position is displaced from the lock position by at least the second predefined offset, the VICM 60 may automate an electronic "missing latch" notification indicating the latching element is missing. Upon completion of process block 215, the method 200 of FIG. 2 may proceed to terminal block 211 and temporarily end or may wait for feedback from the vehicle owner/operator.

With continuing reference to FIG. 2, a CHARGE CONDITIONALLY DISABLED display process block 217 may execute memory-stored instructions that cause the VICM 60 to output an electronic "user prompt" notification that solicits the vehicle user to input a selection that either approves or rejects the automated disabling of vehicle charging. Upon receipt of a user "rejection" input in which the vehicle user has rejected the automated disabling of vehicle charging, the VICM 60 may responsively transmit an electronic "limited capacity" enabling signal to the OBCM/BDU 66 to enable charging of the traction battery pack 14 at a preset reduced charging rate (e.g., reduced from 400 A to 24 A or 90 A). At the same time, the VICM 66 may optionally respond to receipt of a user input rejecting the disabling of vehicle charging by outputting an electronic "press" activation signal to the actuator device 72; this signal causes the actuator device 72 to intentionally overtravel the locking element 74 past the lock position such that the locking element 74 presses directly against the plug head 31 and compresses the plug head 31 against the plug receptacle 64. Conversely, upon receipt of a user "approval" in which the vehicle user has approved the automated disabling of vehicle charging, the VICM 60 may responsively transmit a disabling signal to the BDU 66 to disable charging of the battery pack 14.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor. (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling charging of a vehicle having a battery assembly connectable via a charger port to a charger coupler of a vehicle charging system, the method comprising:

receiving, via a vehicle controller, a connection signal indicating the charger coupler of the vehicle charging system is inserted into the charger port of the vehicle;

transmitting, via the vehicle controller responsive to receiving the connection signal, an activation signal to an actuator device of a coupler locking system of the vehicle to move a locking element towards a latching element of the charger coupler;

receiving, via the vehicle controller from a position sensing device after transmitting the activation signal, sensor data indicative of a travel position of the locking element;

determining, via the vehicle controller using the sensor data, if the travel position of the locking element is displaced from a predefined lock position at which the locking element contacts the latching element; and transmitting, via the vehicle controller responsive to determining the travel position is displaced from the predefined lock position, a disabling signal to a vehicle battery charging system of the vehicle to disable charging of the battery assembly.

2. The method of claim 1, wherein determining the travel position is displaced from the predefined lock position includes determining the travel position is displaced from the predefined lock position by at least a first predefined offset.

3. The method of claim 2, further comprising outputting, via the vehicle controller responsive to determining the travel position is displaced from the predefined lock position by at least the first predefined offset, a fractured latch notification indicating the latching element of the charger coupler is fractured.

4. The method of claim 1, wherein determining the travel position is displaced from the predefined lock position includes determining the travel position is displaced from the predefined lock position by at least a second predefined offset.

5. The method of claim 4, further comprising outputting, via the vehicle controller responsive to determining the travel position is displaced from the predefined lock position by at least the second predefined offset, a missing latch notification indicating the latching element of the charger coupler is missing.

6. The method of claim 1, further comprising:

outputting, via the vehicle controller responsive to determining the travel position is displaced from the predefined lock position, a user-prompt notification prompting a user of the vehicle to approve or reject the disabling of the charging of the battery assembly;

receiving, via the vehicle controller, a user rejection input signal from the user rejecting the disabling of the charging of the battery assembly; and transmitting, via the vehicle controller responsive to receiving the user rejection input signal, a limited-capacity enabling signal to the vehicle battery charging system to enable charging of the battery assembly at a preset reduced charging rate.

7. The method of claim 6, further comprising transmitting, via the vehicle controller responsive to receiving the user rejection input signal, a press activation signal to the actuator device to overtravel the locking element past the lock position and press against a plug head of the charger coupler to compress the plug head against a plug receptacle of the charger port.

8. The method of claim 6, further comprising:

receiving, via the vehicle controller, a user approval input signal from the user approving the disabling of charging of the battery assembly,

wherein transmitting the disabling signal to disable charging of the battery assembly is further in response to receiving the user approval input signal.

9. The method of claim 1, further comprising:
determining, via the vehicle controller using the sensor data, if the travel position of the locking element is approximately equal to the predefined lock position; and
transmitting, via the vehicle controller responsive to determining the travel position is approximately equal to the predefined lock position, a full-capacity enabling signal to the vehicle battery charging system to enable charging of the battery assembly.

10. The method of claim 9, further comprising transmitting, via the vehicle controller responsive to determining the travel position is approximately equal to the predefined lock position, a lock activation signal to the actuator device to press the locking element against the latching element to lock the charger coupler to the charger port.

11. The method of claim 1, wherein the disabling signal causes a battery disconnect unit (BDU) of the vehicle battery charging system to open one or more electrical switches to thereby electrically disconnect the battery assembly from the charger port.

12. The method of claim 1, wherein the locking element includes a translatable locking plate or a rotatable locking cam and the actuator device includes an electric stepper motor or an electric servo motor operable to move the locking element to multiple positions between a deactivated position and an overtravel position past the predefined lock position.

13. The method of claim 12, wherein the position sensing device includes a linear or rotational transducer or encoder operable to output the sensor data indicative of a real-time or near real-time position as the travel position of the locking element.

14. A non-transitory, computer-readable medium storing instructions executable by one or more processors of a vehicle controller to control charging of a vehicle, the vehicle having a charger port and a battery assembly connectable via the charger port to a charger coupler of a vehicle charging system, the instructions, when executed by the one or more processors, causing the vehicle controller to perform operations comprising:
receiving a connection signal indicating the charger coupler of the vehicle charging system is inserted into the charger port of the vehicle;
transmitting, responsive to receiving the connection signal, an activation signal to an actuator device of a coupler locking system of the vehicle to move a locking element of the coupler locking system towards a latching element of the charger coupler;
receiving, from a position sensing device of the vehicle after transmitting the activation signal, sensor data indicative of a travel position of the locking element;
determining, using the sensor data, if the travel position of the locking element is displaced from a predefined lock position at which the locking element contacts the latching element; and
transmitting, responsive to determining the travel position is displaced from the predefined lock position, a disabling signal to a vehicle battery charging system of the vehicle to disable charging of the battery assembly.

15. A motor vehicle, comprising:
a vehicle body with a passenger compartment;
a plurality of road wheels attached to the vehicle body;

a traction motor attached to the vehicle body and operable to drive one or more of the road wheels to thereby propel the motor vehicle;
a traction battery pack attached to the vehicle body and electrically connected to the traction motor to transmit electrical power therewith;
a charger port configured to receive a charger coupler of a vehicle charging system and thereby electrically connect the traction battery pack to the vehicle charging system;
a coupler locking system adjacent the charger port and including an actuator device operable to move a locking element against a latching element of the charger coupler; and
a vehicle controller programmed to:
receive a connection signal indicating the charger coupler is inserted into the charger port;
responsive to receiving the connection signal, transmit an activation signal to the actuator device to move the locking element towards the latching element;
after transmitting the activation signal, receive sensor data from a position sensing device indicative of a travel position of the locking element;
determine if the travel position of the locking element is displaced from a predefined lock position at which the locking element contacts the latching element; and
responsive to determining the travel position is displaced from the predefined lock position, transmit a disabling signal to a vehicle battery charging system to disable charging of the traction battery pack.

16. The motor vehicle of claim 15, wherein determining the travel position is displaced from the predefined lock position includes determining the travel position is displaced from the predefined lock position by at least a first predefined offset, and wherein the vehicle controller, responsive to determining the travel position is displaced from the predefined lock position by at least the first predefined offset, transmits a fractured latch notification indicating the latching element of the charger coupler is fractured.

17. The motor vehicle of claim 15, wherein determining the travel position is displaced from the predefined lock position includes determining the travel position is displaced from the predefined lock position by at least a second predefined offset, and wherein the vehicle controller, responsive to determining the travel position is displaced from the predefined lock position by at least the second predefined offset, transmits a missing latch notification indicating the latching element of the charger coupler is missing.

18. The motor vehicle of claim 15, wherein the vehicle controller is further programmed to:
responsive to determining the travel position is displaced from the predefined lock position, output a user-prompt notification prompting a user of the vehicle to approve or reject the disabling of the charging of the traction battery pack;
receive a user rejection input signal from the user rejecting the disabling of the charging of the traction battery pack; and
responsive to receiving the user rejection input signal, transmit a limited-capacity enabling signal to the vehicle battery charging system to enable charging of the traction battery pack at a preset reduced charging rate.

19. The motor vehicle of claim 18, wherein the vehicle controller is further programmed to transmit, responsive to receiving the user rejection input signal, a press activation signal to the actuator device to overtravel the locking element past the lock position and press against a plug head of the charger coupler to compress the plug head against a plug receptacle of the charger port.

20. The motor vehicle of claim 15, wherein the vehicle controller is further programmed to:

determine if the travel position of the locking element is approximately equal to the predefined lock position; and responsive to determining the travel position is approximately equal to the predefined lock position, transmit a full-capacity enabling signal to the vehicle battery charging system to enable charging of the traction battery pack.

\* \* \* \* \*